United States Patent
Hill et al.

(10) Patent No.: US 10,316,908 B2
(45) Date of Patent: Jun. 11, 2019

(54) AIRCRAFT BRAKE ASSEMBLY STRUCTURES FOR REDUCING NOISE

(71) Applicant: Meggitt Aircraft Braking Systems, Akron, OH (US)

(72) Inventors: James L. Hill, Massillon, OH (US); Michael J. Suponcic, Akron, OH (US); Jamie B. Clason, Stow, OH (US); Matthew E. Eplin, Cuyahoga Falls, OH (US); Michael B. Eccles, Shirley (GB); John M. Hall, McDonald, PA (US); Kurt Burkhalter, Akron, OH (US); Mark P. Dyko, Copley, OH (US); Dene W. Glaznieks, Nuneaton (GB); Dana J. Fehr, Uniontown, OH (US)

(73) Assignee: MEGGITT AIRCRAFT BRAKING SYSTEMS CORPORATION, Akron, OH (US)

( * ) Notice: Subject to any disclaimer, the term of this patent is extended or adjusted under 35 U.S.C. 154(b) by 0 days.

(21) Appl. No.: 15/510,012

(22) PCT Filed: Sep. 10, 2015

(86) PCT No.: PCT/US2015/049320
§ 371 (c)(1),
(2) Date: Mar. 9, 2017

(87) PCT Pub. No.: WO2016/040561
PCT Pub. Date: Mar. 17, 2016

(65) Prior Publication Data
US 2017/0299002 A1  Oct. 19, 2017

Related U.S. Application Data

(60) Provisional application No. 62/048,443, filed on Sep. 10, 2014.

(51) Int. Cl.
*F16D 55/24* (2006.01)
*F16D 65/00* (2006.01)
(Continued)

(52) U.S. Cl.
CPC ......... *F16D 65/0012* (2013.01); *F16D 55/40* (2013.01); *F16D 65/0006* (2013.01);
(Continued)

(58) Field of Classification Search
CPC ... B64C 25/42; F16D 65/0006; F16D 65/123; F16D 2065/1332; F16D 2200/0052;
(Continued)

(56) References Cited

U.S. PATENT DOCUMENTS 3,010,543 A * 11/1961 Pear, Jr. ............... F16D 55/40
                                          188/196 M
3,198,295 A    8/1965 Fangman et al.
(Continued)

*Primary Examiner* — Bradley T King
*Assistant Examiner* — Mahbubur Rashid
(74) *Attorney, Agent, or Firm* — Renner, Kenner, Greive, Bobak, Taylor & Weber, Co., L.P.A.

(57) ABSTRACT

Various embodiments of aircraft brake assembly structures are provided for achieving noise reduction during braking activity. In certain embodiments of the invention, the actual application of force to the pressure plate is regulated such that a different number of actuator pistons are used during low-energy stops than during high-energy stops. In other embodiments of the invention, the pressure plate or endplate is augmented as to surface area in some instances and as to a taper angle in others, again to achieve a desired increase in effective pressure application during low-energy stops. In other embodiments of the invention, the stator and/or rotor disks are characterized by slots to break up the propagation of noise waves.

6 Claims, 12 Drawing Sheets

(51) Int. Cl.
*F16D 65/12* (2006.01)
*F16D 55/40* (2006.01)
*B64C 25/42* (2006.01)
*F16D 65/02* (2006.01)

(52) U.S. Cl.
CPC .......... *F16D 65/122* (2013.01); *F16D 65/123* (2013.01); *F16D 65/127* (2013.01); *B64C 25/42* (2013.01); *F16D 2065/1332* (2013.01); *F16D 2200/0021* (2013.01); *F16D 2200/0052* (2013.01)

(58) Field of Classification Search
CPC .... F16D 55/40; F16D 65/0012; F16D 65/122; F16D 65/127; F16D 2065/132; F16D 55/24
USPC .......................................................... 303/190
See application file for complete search history.

(56) References Cited

U.S. PATENT DOCUMENTS

| | | | | | |
|---|---|---|---|---|---|
| 3,708,042 | A | * | 1/1973 | Krause | F16D 55/36 188/218 XL |
| 3,800,392 | A | * | 4/1974 | Cook | F16C 35/06 188/218 XL |
| 3,951,240 | A | * | 4/1976 | Dowell | F16D 55/40 188/251 A |
| 3,972,395 | A | * | 8/1976 | Jannasch | F16D 55/40 188/218 XL |
| 4,585,096 | A | * | 4/1986 | Bok | F16D 13/648 188/71.5 |
| 4,613,021 | A | * | 9/1986 | Lacombe | F16D 65/122 188/218 XL |
| 4,878,563 | A | * | 11/1989 | Baden | F16D 55/36 188/251 A |
| 5,769,185 | A | * | 6/1998 | Main | F16D 65/126 188/18 A |
| 5,904,234 | A | * | 5/1999 | Kosumi | F16D 13/52 192/109 A |
| 7,159,698 | B2 | * | 1/2007 | Banks | F16D 65/122 188/218 XL |
| 9,482,299 | B1 | * | 11/2016 | Kirkpatrick | F16D 65/12 |
| 2004/0011602 | A1 | | 1/2004 | Souetre et al. | |
| 2011/0220763 | A1 | * | 9/2011 | Enright | B64C 25/44 244/111 |
| 2012/0160956 | A1 | * | 6/2012 | Gaia | B64C 25/405 244/50 |
| 2014/0174863 | A1 | * | 6/2014 | Kirkpatrick | F16D 55/36 188/218 XL |
| 2015/0001017 | A1 | * | 1/2015 | Kirkpatrick | F16D 65/12 188/218 XL |

* cited by examiner

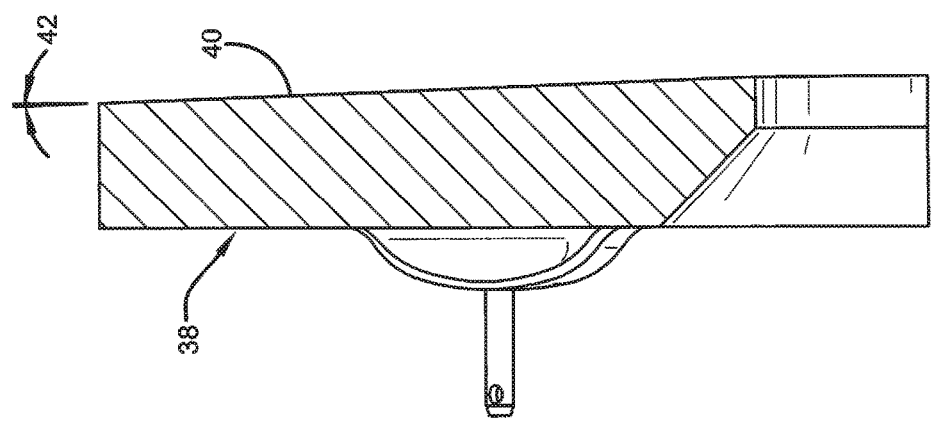
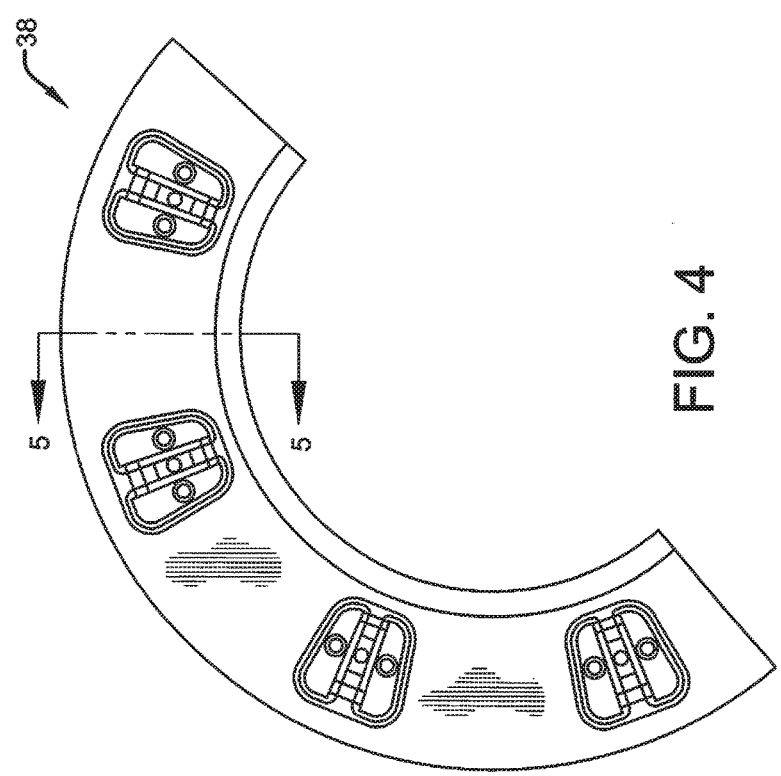

AIRCRAFT BRAKE ASSEMBLY STRUCTURES FOR REDUCING NOISE

CROSS-REFERENCE TO RELATED APPLICATIONS

This application claims the benefit of U.S. Provisional Patent Application Ser. No. 62/048,443, filed Sep. 10, 2014, and incorporated herein by reference.

TECHNICAL FIELD

The invention herein resides in the art of braking systems and, more particularly, to braking systems for aircraft. More specifically, the invention relates to configurations of brake assemblies and the constituent parts thereof for reducing noise during aircraft braking activities.

BACKGROUND OF THE INVENTION

Presently, aircraft brake assemblies typically include a heat stack of alternatingly interleaved stator and rotor disks of a carbon composition. The disks are maintained between pressure plate and endplate disks such that the application of pressure and resulting force to the pressure plate causes the stators and rotor disks to frictionally engage, causing mechanical energy to dissipate as heat in the heat stack as the aircraft is brought to a stop. The generation of noise in the brake assemblies resulting from the interengagement of the disks with each other and/or the pressure plate and endplate has often been a problem attendant to the use of the otherwise preferred carbon brake assemblies. The problem often seems to be most pronounced during low-energy stops, such as during taxiing and the like. While the attendant noise is typically not indicative of any deficiencies or shortcomings in the efficacy of the brake system, it is often annoying and disconcerting to passengers. Accordingly, it is desired to eliminate, or at least attenuate, such noise without adverse effects on the braking operation.

In the past, approaches to such noise suppression or attenuation has focused on either modifying or adjusting the carbon mix employed in making the stator and rotor disks or in employing various types of mechanical vibration or oscillation dampers to physically dampen the noise generated by the disks during a braking activity. Neither of these approaches has resulted in much success, and has often had concomitant reduction in braking efficiency or increase in manufacturing costs.

SUMMARY OF THE INVENTION

In light of the foregoing, it is an aspect of the present invention to provide aircraft brake assembly structures for reducing noise by selectively controlling the number of brake actuator pistons employed at times when noise is typically generated.

Another aspect of the invention is to provide an aircraft brake assembly structure for reducing noise that modifies the configuration of the pressure plate or endplate of the brake assembly by providing a tapered interface to those structures.

Still a further aspect of the invention is the provision of aircraft brake assembly structures for reducing noise wherein the wear surface interface between the pressure plate and a first rotor of the heat stack is adjusted to effectively maximize the forceful engagement between the two over a reduced area.

Still a further aspect of the invention is the provision of aircraft brake assembly structures for reducing noise wherein the disks contain slots therein for breaking up or providing discontinuities in noise oscillation paths within the disks.

It is further an aspect of the invention to provide aircraft brake assembly structures for reducing noise that are cost effective, easy to implement, and which do not result in reduction in braking efficiency.

The foregoing and other aspects of the invention are achieved by an aircraft brake assembly configured to minimize noise during braking, comprising a heat stack of alternating interleaved stator disks and rotor disks between a pressure plate and endplate; and means for altering a force pattern from said pressure plate and/or said endplate upon said heat stack as a function of a magnitude of braking force applied to said heat stack as between high-energy landing operations and low-energy taxiing operations.

Other aspects of the invention that will become apparent herein are achieved by an aircraft brake assembly configured to minimize noise during braking, comprising a heat stack of alternating interleaved stators and rotors between a pressure plate and endplate, wherein at least certain of said stators and rotors are characterized by slots therethrough, said slots breaking up a propagation of vibrational waves during braking.

Still other aspects of the invention that will be described are achieved by an aircraft brake assembly configured to minimize noise during braking, comprising: a pressure plate having an inner circular region and an outer circular region, said outer circular region being immediately adjacent and contacting said inner circular region and being of less thickness than said inner circular region; and a rotor disk having an inner circular region and an outer circular region, said inner and outer circular regions of said rotor being separated by a circular groove, said circular groove being aligned with a transition between said inner and outer circular regions of said pressure plate.

BRIEF DESCRIPTION OF THE DRAWINGS

For a complete understanding of various aspects of the invention, reference should be made to the following detailed description and accompanying drawings wherein:

FIG. 4 is an endplate, modified to contain a taper in accordance with another embodiment of the invention;

FIG. 5 is a cross-sectional view of the endplate of FIG. 4, taken along the line 5-5;

DETAILED DESCRIPTION OF ILLUSTRATIVE EMBODIMENTS

Figure 1:
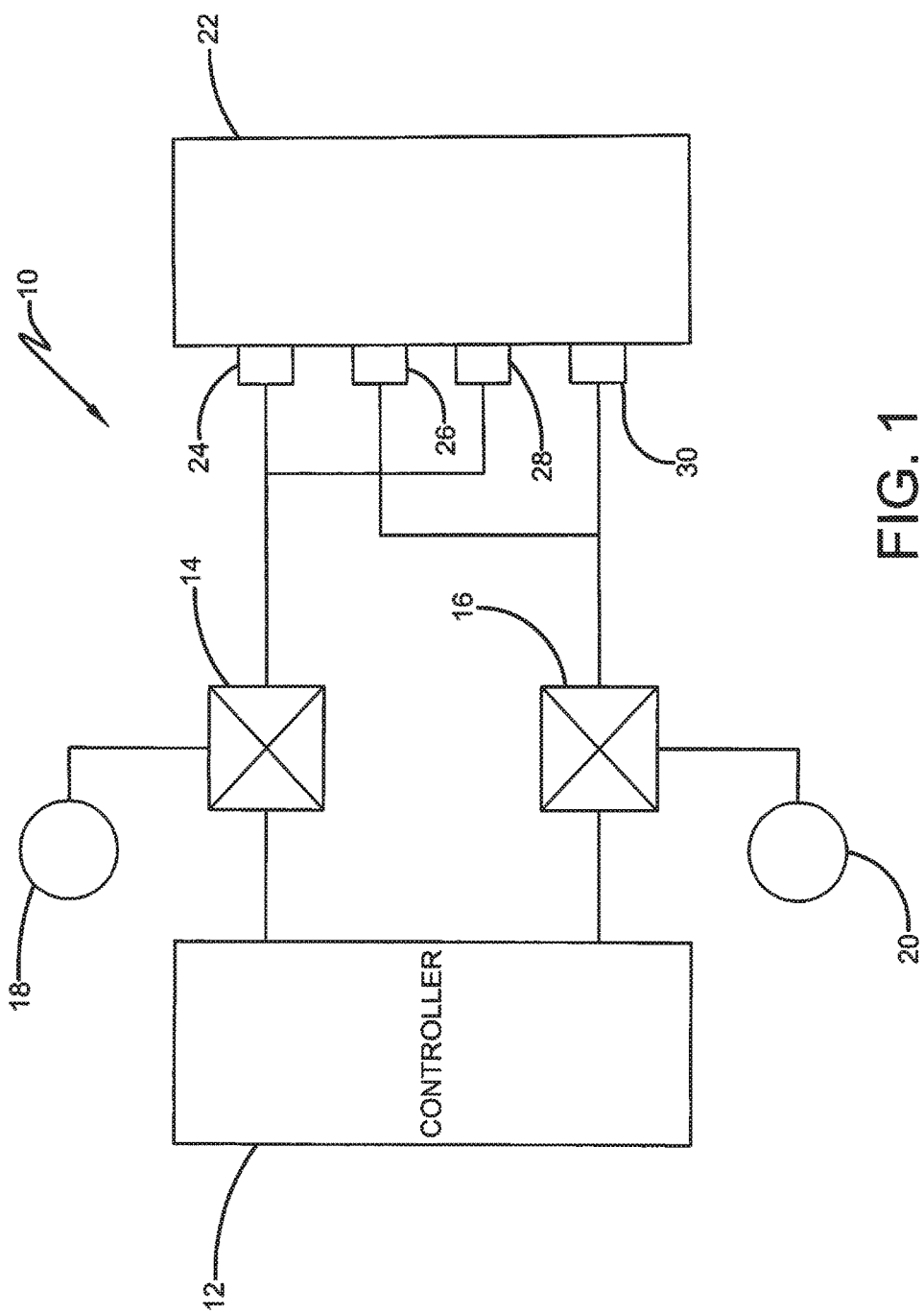
FIG. 1 is a schematic diagram of an aircraft brake system employing a first embodiment of the invention in which sets of brake actuator pistons are separately controlled.

Referring now to the drawings and more particularly FIG. 1, it can be seen that an aircraft brake system in accordance with a first embodiment of the invention is designated generally by the numeral 10. The brake system 10 includes a controller 12 interconnected with a pair of independently controlled brake control valves 14, 16, each respectively associated with either its own hydraulic system 18, 20 or a single common source. An aircraft brake assembly 22 is also provided consisting of a pressure plate, endplate, and interposed, alternatingly interleaved stator and rotor brake disks, in somewhat standard fashion. In the preferred embodiment of the invention, the brake disks are of a carbon-carbon construction.

Those skilled in the art will appreciate that the application of pressure or force to the pressure plate urges the stators and rotors into frictional engagement to achieve the desired braking action. In that regard, brake-actuating piston assemblies 24, 26, 28, 30 are connected to the brake control valves 14, 16, and the actuation of the pistons is controlled by the controller 12.

As shown in FIG. 1, piston assemblies 24, 28 are in paired connection with the brake control valve 14, while the pistons 26, 30 are in paired interconnection with the brake control valve 16. With this type of architecture, the controller 12 may, during high-energy stops, control brake control valves 14, 16 in tandem, such that all of the pistons 24-30 are actuated in unison. This would typically be the arrangement during landing. During taxiing operations, only one of the valves 14, 16 may be selected for operation by the controller 12, such that either the pair of pistons 24, 28 or the pair 26, 30 is actuated. During these low-energy braking operations, by using only half of the brake pistons, a greater force is required to be exerted on the pressure plate by these few pistons than if all four were being applied. The use of the fewer number of pistons at a higher pressure or force has been found to significantly reduce the amount of noise generated during the braking operation. Those skilled in the art will appreciate that the pistons 24-30 are typically uniformly positioned about the pressure plate, and the pairing of the pistons would typically be such as to achieve a uniform pairing across the surface of the pressure plate. Accordingly, where the piston engages the pressure plate and the pressure plate engages the heat stack, the force will be greater and more localized than when all of the pistons are employed.

The determination of the braking arrangement may be under pilot control or achieved upon occurrence of an event. For example, a threshold ground speed may be set, below which only one of the valves 14, 16 operates, and above which both operate. Alternatively, when brake pedal travel exceeds a first high level, such as 80%, both valves 14, 16 are enabled, but when below a lesser threshold, only one would control. Those skilled in the art will appreciate that the selection of which valve to operate during various braking events can be controlled by logic within the controller to achieve certain objectives, such as uniform wear, that are useful for brake operation.

Figure 3:
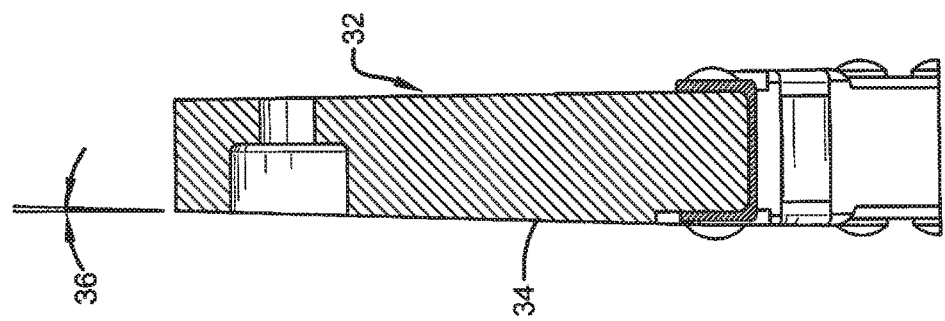
FIG. 3 is a cross-sectional view of the pressure plate of FIG. 2, taken along the line 3-3.
Figure 2:
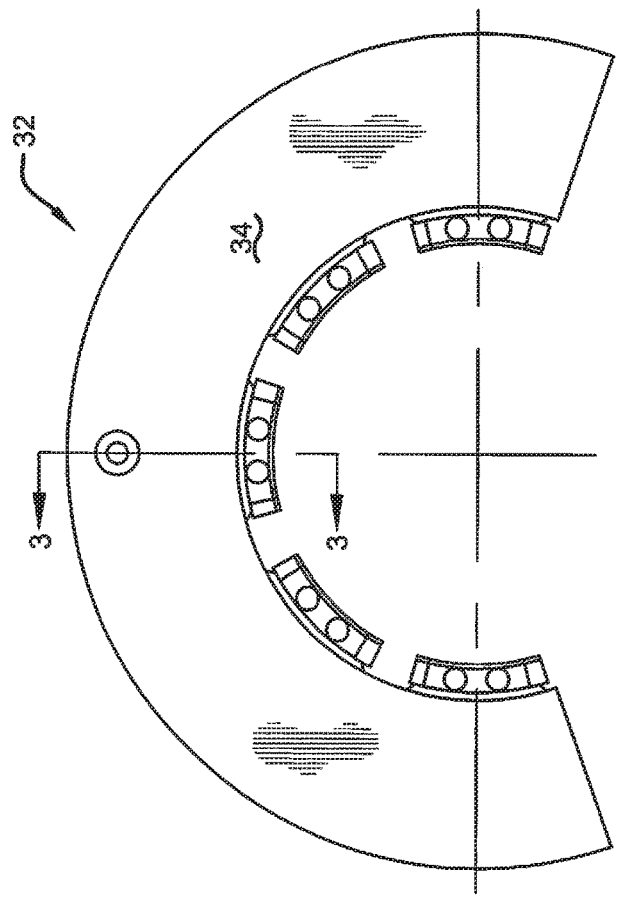
FIG. 2 is a partial sectional view of a pressure plate modified to taper in accordance with an embodiment of the invention.

With reference now to FIGS. 2-5, an appreciation may be obtained of other embodiments of the invention wherein augmentations are made to the pressure plate and/or endplate of a brake assembly, such as the brake assembly 22, described above. As shown, the pressure plate 32 has a wear surface 34, which typically engages the first rotor of the heat stack of stators and rotors. While typically the pressure plate 34 is totally flat and has a surface that is totally parallel to that of the first rotor of the heat stack, this embodiment of the invention deviates from that concept. As shown in FIG. 3, the wear surface 34 of the pressure plate has a taper angle 36 of a very slight amount, typically on the order of 0.25-1.5 degrees, and most preferably on the order of about 0.7 degrees. It has been found that employing such a taper again allows for the concentration of force toward the inner diameter of the pressure plate and associated stator and rotor disks during low energy braking activities, such as during taxiing, resulting in a reduction of noise.

FIGS. 4 and 5 show a similar augmentation to the endplate 38, where the wear surface or contact surface 40 is characterized by a taper angle 42 of a similar nature to that discussed above with regard to the pressure plate 32. In practice, while it has been found that taper of the contact faces of the pressure plate and endplate both contribute to noise attenuation or reduction, the same has been most prominent when the pressure plate is tapered.

When the pressure plate or endplate is tapered as discussed with regard to FIGS. 2-5, there is a concern that the wear rates 34, 40 of the pressure plate 32 and endplate 38 are such that the desired taper angles 36, 42 erode with wear to the point that the wear surfaces are no longer tapered. While this concern is not of great magnitude because it has been found that the wear rates of carbon composites used for aircraft brakes can be designed to be quite low, the present invention contemplates a structure for eliminating that problem in the event it should arise. It is presently contemplated that when a tapered wear surface of a pressure plate or endplate is employed, the endplate or pressure plate may be formed of a gradient of carbon-carbon material exhibiting a varying wear rate extending radially from the center of the plate to its outer circumference. The slower-wearing mix of carbon-carbon composite would be near the center of the plate, with the faster-wearing composite mix being at the outer surface, the gradient changing as a function of contemplated braking activity and resultant wear. By appropriately selecting the gradient, the wear can be uniform radially across the plate even though the forces imparted are not uniform. As a consequence, the plates maintain a substantially consistent taper throughout their useful lives.

Figure 6:
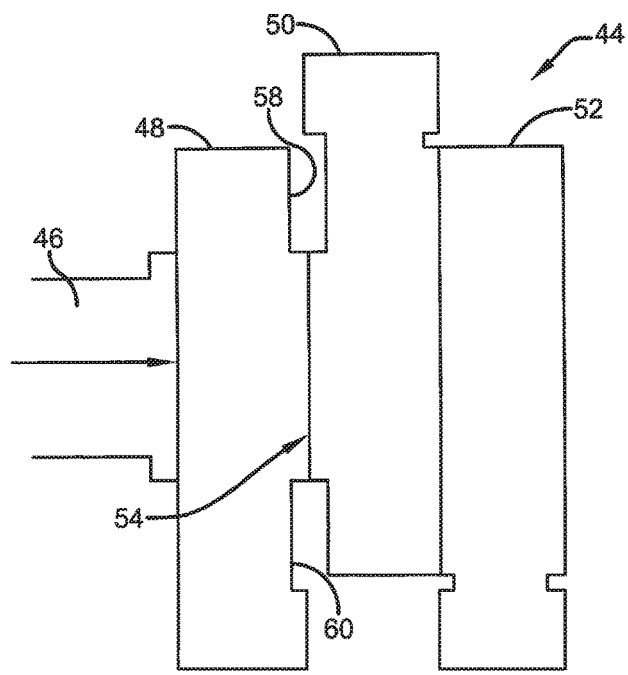
FIG. 6 is an illustration of a portion of a brake assembly employing a pressure plate and first rotor machined to have a reduced frictional contact area.
Figure 7:
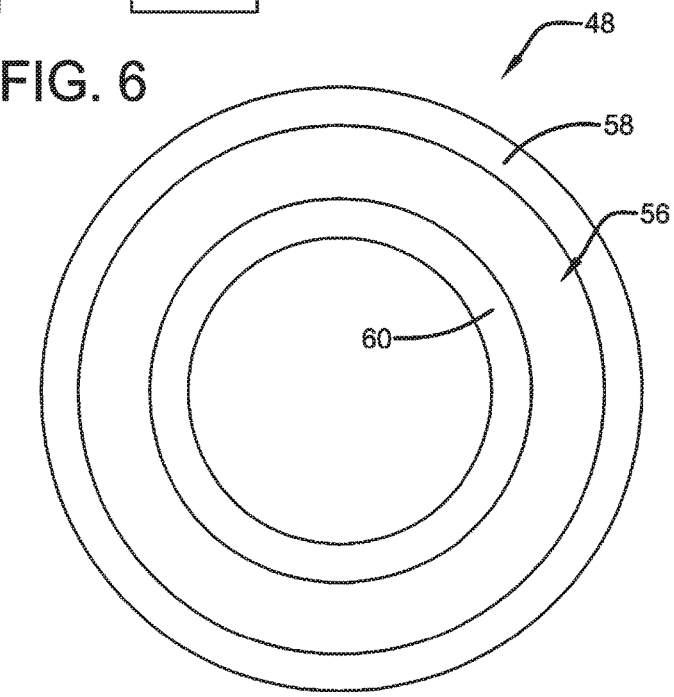
FIG. 7 is a plan view of the pressure plate of FIG. 6.

Referring now to FIGS. 6 and 7, an appreciation can be obtained with regard to yet another embodiment of the invention wherein the pressure plate and the first rotor of the brake assembly, such as the brake assembly 22, are machined to have a reduced frictional interface therebetween, resulting in a concentrated, localized, and increased application of force or pressure during braking activity. As shown, a portion of a brake assembly 44 includes a brake actuating piston 46 operating against a pressure plate 48, which is urged against a first rotor of the heat stack 50, which in turn is urged against a first stator 52. The friction surface interface 54 between the pressure plate 48 and first rotor 50 is, as clearly apparent, less than the friction interfaces between the stators and rotors in the heat stack. This is achieved by machining away portions of the pressure plate 48 and first rotor 50, which would otherwise be present. This is shown in FIG. 7, where the wear surface 56 of the pressure plate is defined between recesses 58, 60, which have been machined away on the pressure plate 48. Similar action has taken place with regard to the first rotor 50, such that the wear surface 56 of the pressure plate is congruent with the wear surface of the first rotor 50 so that there is no nesting capability between the two. It will be appreciated that the placement of the friction surface interface 54 may preferably be toward the inner diameter of the pressure plate 48 and rotor 50 to concentrate the force in the inner region as with the tapered embodiments, above.

Figure 8:
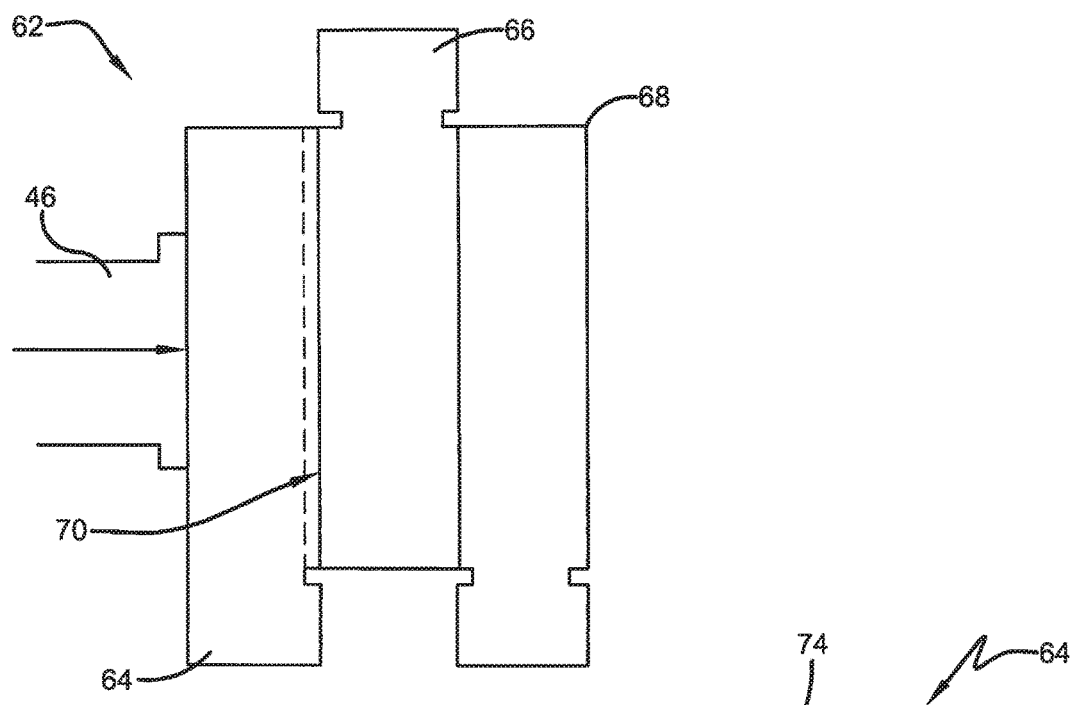
FIG. 8 is an illustration of a portion of a brake assembly made in accordance with another embodiment of the invention.
Figure 9:
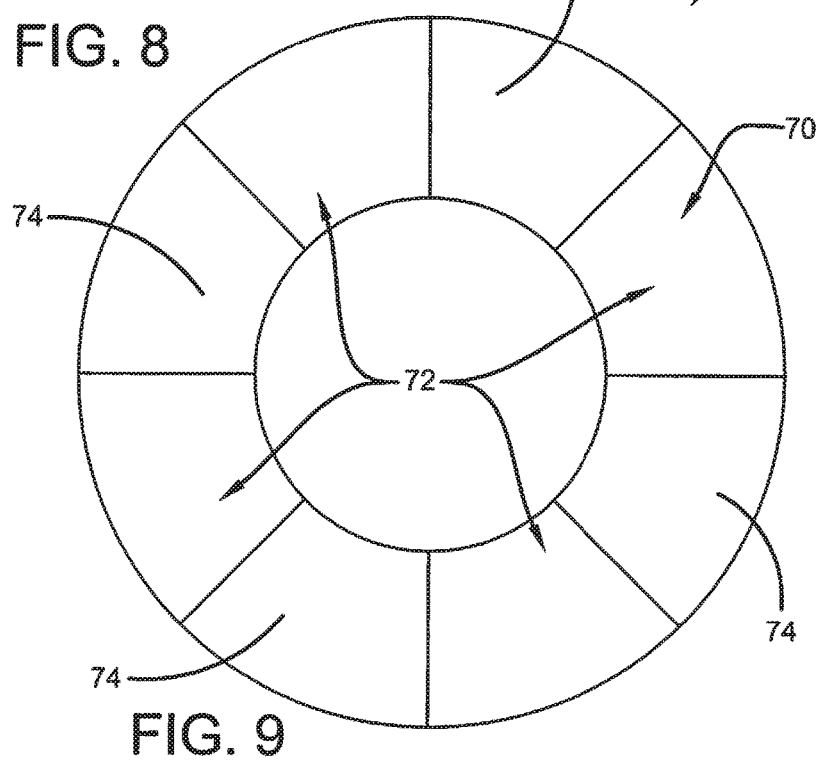
FIG. 9 is a plan view of the pressure plate employed in the embodiment of FIG. 8, showing machined recess portions between wear surfaces.

As shown in FIGS. 8 and 9, yet another embodiment of the invention, similar to that of FIGS. 6 and 7, is shown. Here, a portion of a brake assembly 62 is shown as consisting of a pressure plate 64, a first rotor 66, and a first stator 68. Again, the pressure plate 64 is actuated by appropriate pistons 46. In this embodiment, the wear surface interface 70 between the first rotor 66 and the pressure plate 64 is defined by a plurality of uniformly spaced wear surfaces 72 separated by uniformly spaced recessed surfaces 74. It will be appreciated that the recessed areas 74 are machined away during the manufacturing process. The surface of the first rotor 66 is totally planar, without any such recesses. Employing this structure, the pressure or forces imparted to the first rotor 66 are again localized, accentuated, and uniformly spaced. Accordingly, the noise generally characteristic of low-energy stops is dissipated because the interface between the pressure plate 64 and first rotor 66 is sufficiently reduced such that the force and pressure characteristics at this interface are comparatively increased, characteristic of those of higher-energy stops, where noise is typically not a problem.

Figure 10:
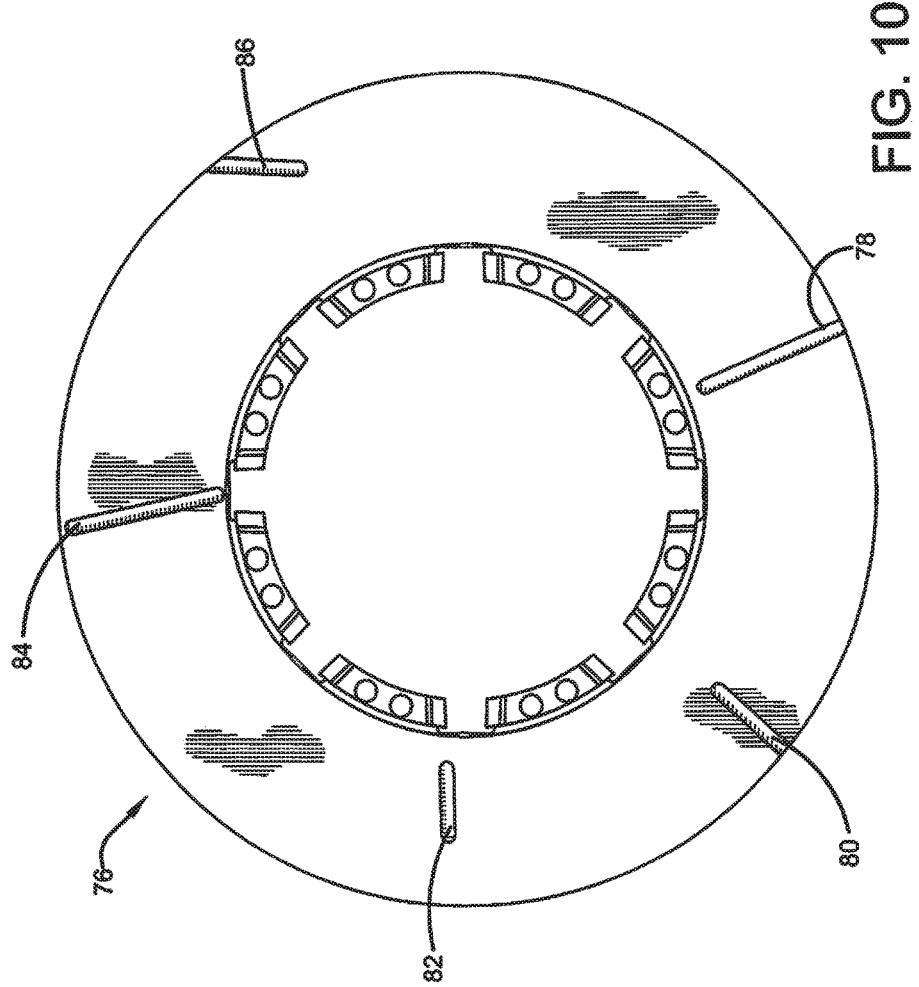
FIG. 10 is a plan view of a brake disk according to another embodiment of the invention characterized by various slots interposed for purposes of attenuating noise.

With reference now to FIG. 10, yet a further approach to noise reduction in a brake assembly is shown where a disk 76, which may be either a stator or rotor disk, is designated by the numeral 76. Here, various slots are placed in the disk for purposes of prohibiting traveling waves from developing across the disk. It has been found that a single slot may be employed, or that multiple slots of varying characteristics can be employed, the choice, selection and combination allowing the disk to be tuned as a function of the carbon material employed, the forces and pressures anticipated, and the noise characteristics otherwise experienced. Disks have been developed using a single slot 78 extending from the outside diameter (OD) of the disk radially toward the inside diameter (ID), and here being on the order of 80% of the extension from the OD to the ID. The invention also contemplates the use of a shorter slot 80, extending from the OD radially toward the ID, but on the order of 50% or less of that distance. The invention also contemplates the employment of a radial slot 82 that is machined totally within the disk, not reaching either the outer circumference or the inner circumference of the disk, but being totally contained between the two.

Other slots may be utilized, such as the slot 84, which is similar to the slot 78, but not fully radial; rather it is canted or angled with respect to the center of the disk 76. A more accentuated canting or angling is apparent with the slot 86, somewhat shorter than the slot 84, but angled more significantly with respect to the center of the disk 76. The positioning, length, width, and degree of radial deviation allows for a tuning of the disk to achieve a desired noise reduction, attenuation or elimination. The invention further contemplates that the grooves that extend to the outer circumference of the disk 76 may serve to alter the localized wear rate of the disk by providing paths for carbon dust to escape as the pressure plate (or endplate, as the case may be), contacts the adjacent rotor in braking engagement. The grooves serve to wipe the dust from the interface between the outside rotors and the engaged pressure plate and endplate, increasing braking efficiency and wear.

The invention contemplates that the ends of the slots will be radiused, as shown, for purposes of structural integrity and to discourage cracks developing from the ends of the slots.

Figure 11:
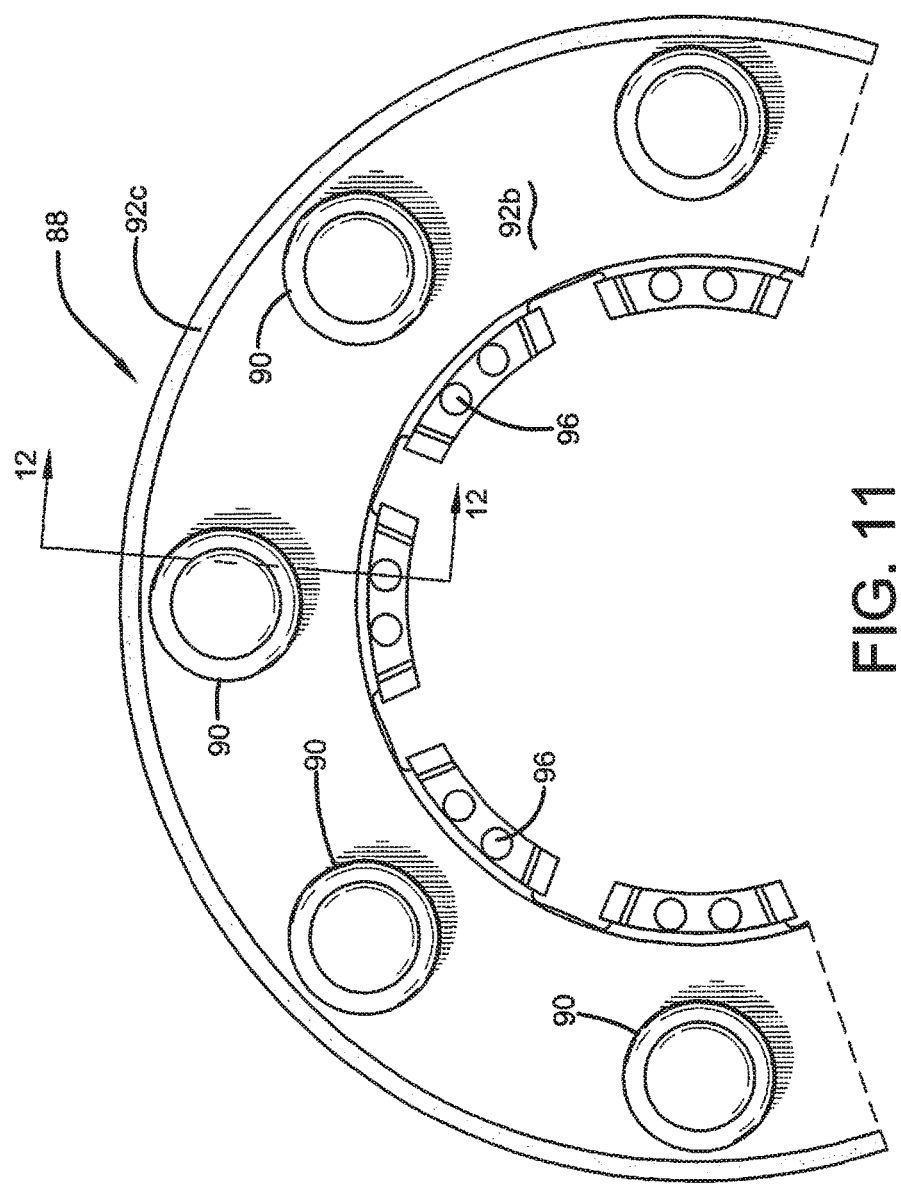
FIG. 11 is a partial view of a pressure plate made in accordance with another embodiment of the invention.
Figure 12:
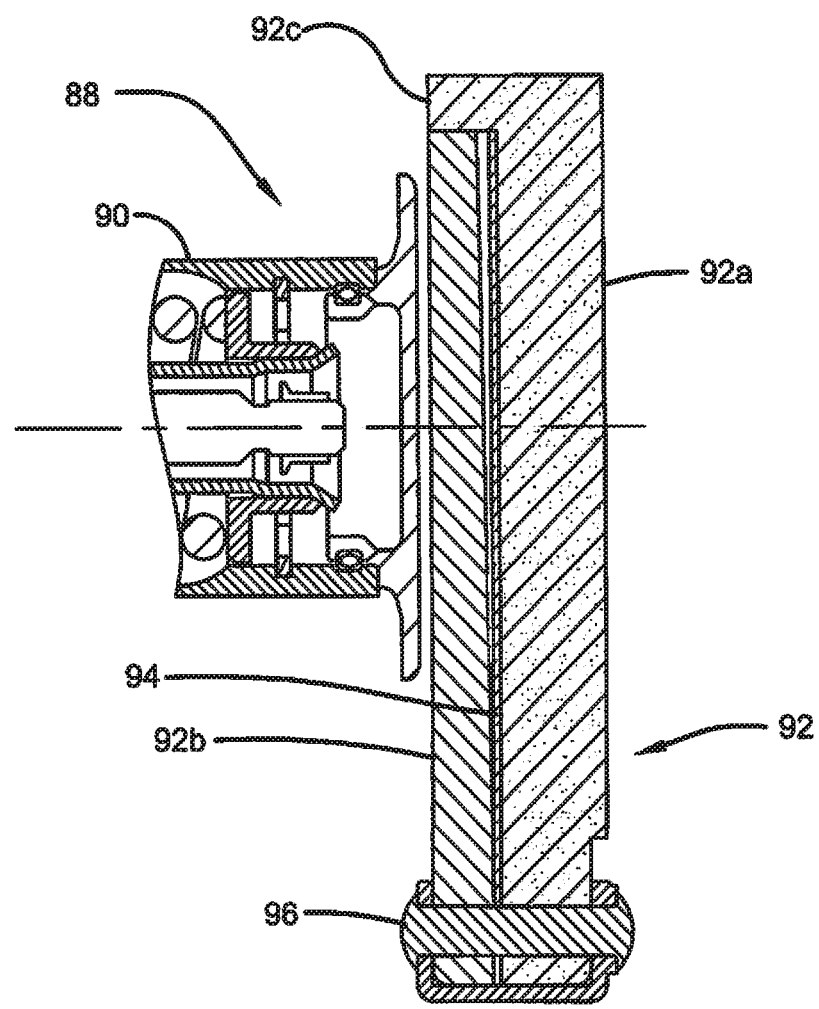
FIG. 12 is a cross-sectional view of the pressure plate of FIG. 11 taken along the line 12-12, showing the pressure plate to comprise a pair of disks separated by a tapered gap having a vibration-attenuating material layer therein.
Figure 13:
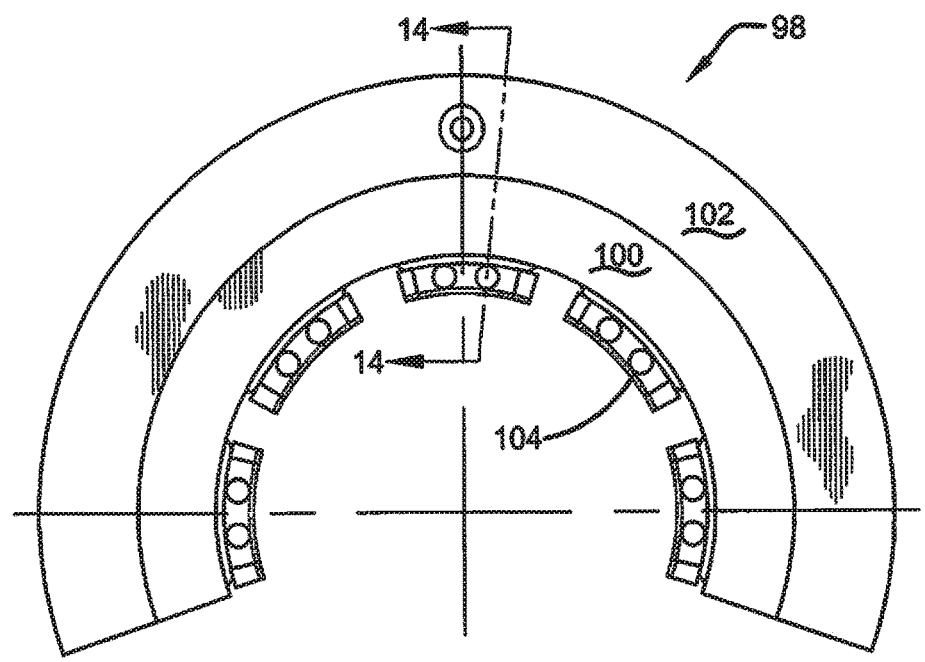
FIG. 13 is a partial view of a pressure plate subassembly made in accordance with yet another embodiment of the invention.

A further embodiment of the invention is shown in FIGS. 11 and 12. Here, a pressure plate assembly is designated generally by the numeral 88, it being understood that the concept of this embodiment can readily be extended to an endplate as well as a pressure plate. The pressure plate assembly 88 includes brake actuators 90 uniformly spaced thereabout, as shown in FIG. 11. The pressure plate 92 is of a split or bifurcated design, comprising a face plate 92a and a back plate 92b. According to a preferred embodiment of the invention, the face plate 92a is of a carbon composite material and is of a cup-shaped design having a circumferential outer lip 92c extending thereabout. The back plate 92b may be of any suitable construction, carbon, steel or the like, and is nestingly received by the cup of the face plate 92a. The face plate 92a is of substantially uniform thickness, while the back plate 92b has a tapered inner surface as shown. The taper of the inner surface of the back plate 92b is on the order of 0.5-2.0 degrees, and preferably at a taper of 1 degree. A sheet of material that provides vibration attenuation 94 is interposed between the face plate 92a and back plate 92b, the sheet having a nominal thickness of 0.01-0.10 inch and preferably 0.03 inch. It has been found that a suitable material for such purposes is sold under the trademark Grafoil and is a film of flexible graphite. Other suitable materials capable of attenuating vibrations in a high-temperature environment are contemplated.

A plurality of rivet-clip assemblies 96 are uniformly spaced about the inner circumference of the pressure plate assembly 88 to hold the plates 92a, 92b in place with the sheet 94 sandwiched therebetween in secure contacting engagement. At the outer circumference, due to the tapered nature of the back plate 92b, the gap between the plates 92a and 92b at their outer circumference is on the order of 0.06-0.10 inch and preferably 0.08 inch. With the sheet 94 preferably taking up 0.03 inch of that space, a nominal 0.05 inch gap remains to be taken up during braking activity.

The sheet 94 serves as a dampening agent, damping physical vibrations and sounds. In use, the taper of the back plate 92b allows for the concentration of force toward the inner diameter of the annular pressure plate and associated stator and rotor disks during low-energy braking activities, such as taxiing, resulting in reduction of noise. As pressure increases for normal braking, the gap between the plates 92a, 92b closes and the forceful engagement of stators and rotors with each other and the pressure plate and endplate extends more broadly over their entire surface, effecting greater braking force. Thus, damping and elimination of noise during low-energy braking operations is achieved, while the capability of standard braking operations during high-energy braking and the like remains.

Another embodiment of the invention employs a reduced frictional interface toward the inner diameter of the rotor and pressure plate so as to concentrate the force toward this region, without the need of a tapered structure as presented in embodiments above.

Figure 14:
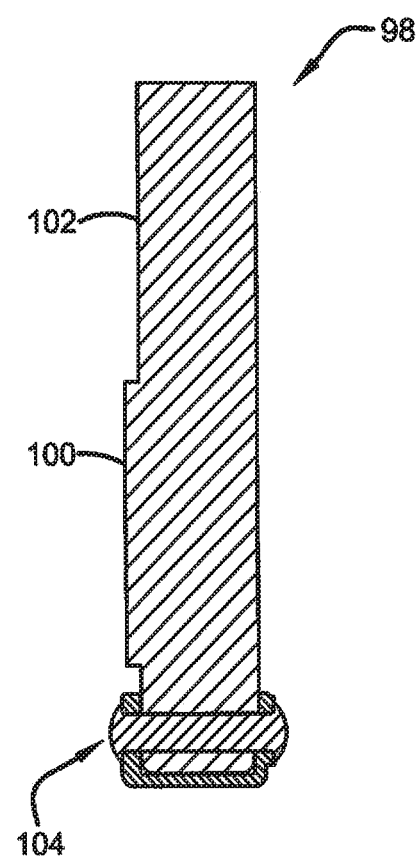
FIG. 14 is a cross-sectional view of pressure plate subassembly of FIG. 13, taken along the line 14-14.
Figure 15:
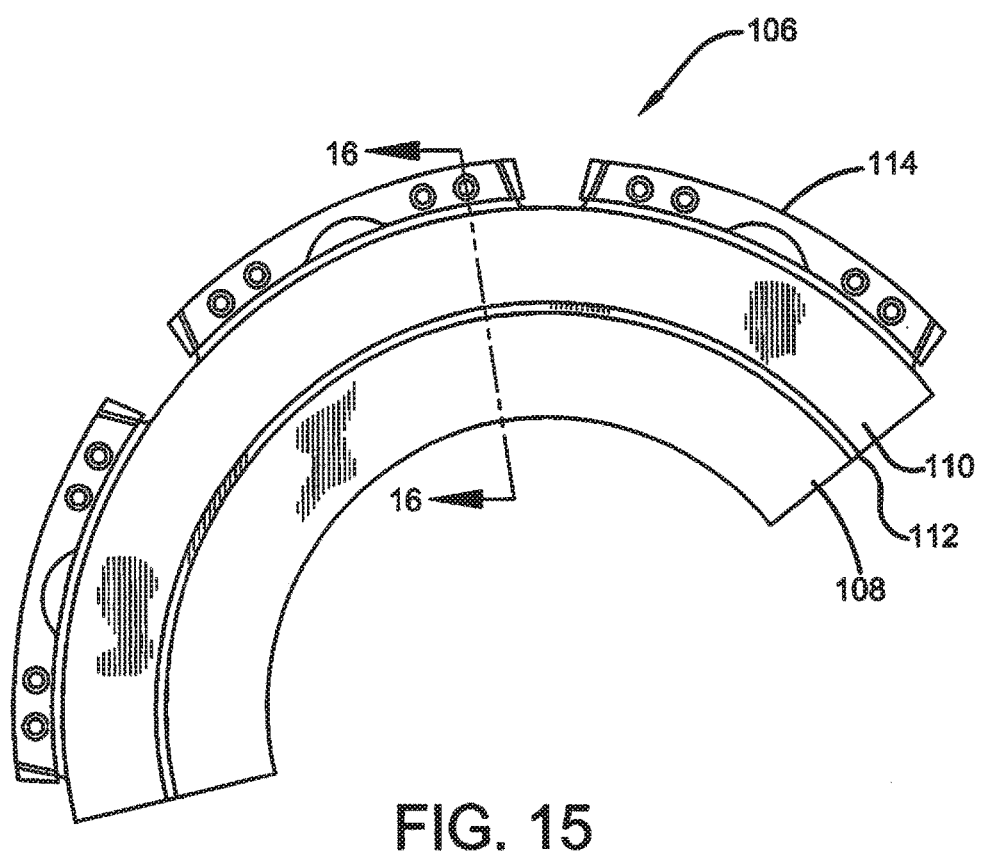
FIG. 15 is a partial view of a rotor subassembly made in accordance with the embodiment of the invention shown in FIGS. 13 and 14.
Figure 16:
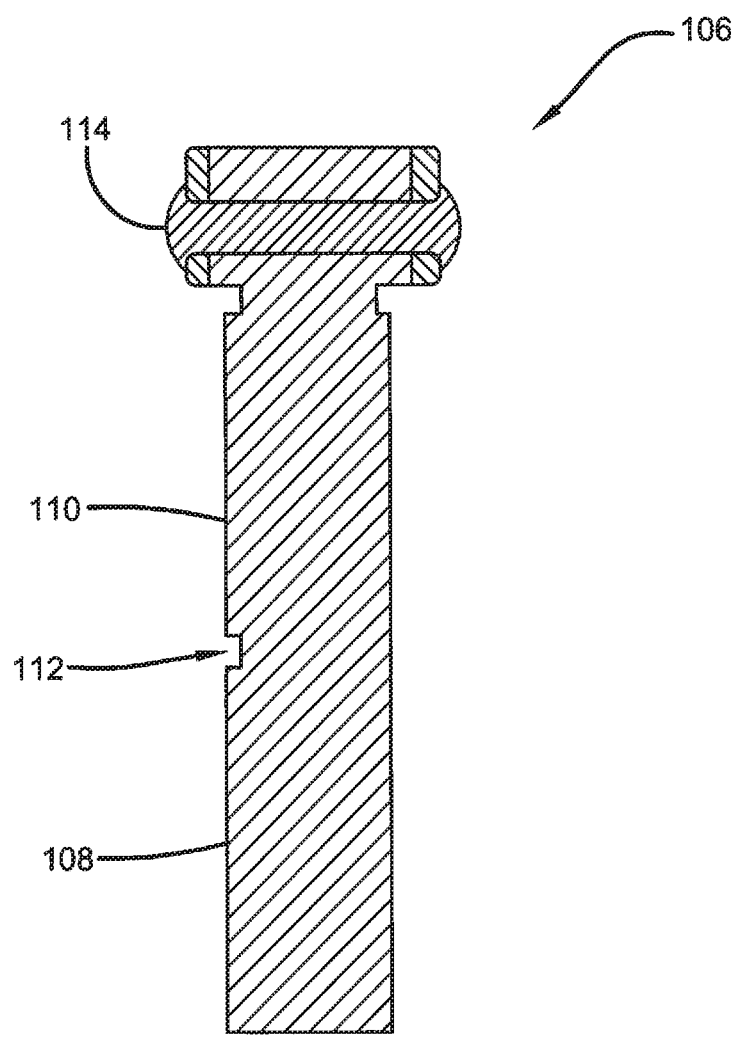
FIG. 16 is a cross-sectional view of the rotor subassembly of FIG. 15, taken along the line 16-16.

With reference to FIGS. 13-16, pressure plate and rotor subassemblies made in accordance with this embodiment of the invention are shown. According to FIG. 13, a pressure plate 98 is provided with an inner region 100 and an outer region 102, the outer region 102 being of reduced thickness, as best shown in FIG. 14. According to a preferred embodiment of the invention, the reduction in thickness at the region 102 is on the order of 0.07-0.10 inch, and most preferably 0.085 inch. Clip assemblies 104 are provided about an inner circumferential edge of the pressure plate assembly 98, in somewhat standard fashion. The rotor subassembly to be used in association with the pressure plate 98 is shown in FIGS. 15 and 16, designated generally by the numeral 106. Here again, the wear surface of the rotor 106 is divided into an inner region 108 and an outer region 110. As shown in FIG. 16, these regions are of the same thickness, and separated by a circular recess 112. This circular recess has a depth on the order of 0.045-0.065 inch, and most preferably 0.055 inch. The width of the circular recess is on the order of 0.115-0.135 inch, and most preferably 0.125 inch. In a brake disk stack, the circular recess 112 is in alignment with the demarcation between the outer region 102 and the inner region 100 of the pressure plate 98. Accordingly, during low-energy braking such as taxiing and the like, high-pressure or high-force braking is engaged between the inner region 100 of the pressure plate assembly 98 and the inner region 108 of the rotor subassembly. Accordingly, even during taxiing and low-energy stops, there is forceful engagement at these surfaces of sufficient magnitude as to reduce the noise commonly incident to low-energy stops. During high-energy stops, the force imparted by the pistons to the pressure plate is sufficient to close the gap between the outer regions 102, 110 and achieve full braking potential. Riveted clip assemblies 114 are provided about the outer circumferential edge of the rotor 106, in standard fashion.

Thus it can be seen that the various aspects of the invention have been achieved by the embodiments presented and described above. While in accordance with the patent statutes, only preferred embodiments of the invention have been presented and described in detail, the invention is not limited thereto or thereby. For an appreciation of the true scope and breadth of the invention, reference should be made to the following claims.

What is claimed is:

1. An aircraft brake assembly configured to minimize noise during braking, comprising:
    a heat stack of alternating interleaved stator disks and rotor disks between a pressure plate and endplate;
    wherein one of said pressure plate and endplate comprises a disk radially tapered in thickness from a thicker inner region to a thinner outer region for altering a force pattern from said one of said pressure plate and said endplate upon said heat stack as a function of a magnitude of braking force applied to said heat stack as between high-energy landing and low-energy taxiing operations; and
    wherein said disk of said one of said pressure plate and endplate is bifurcated, having a face plate and a back plate, said face plate being of a uniform thickness and having a wear surface, and said back plate being tapered on a surface adjacent said face plate.

2. The aircraft braking assembly according to claim 1, further comprising a film of flexible graphite sandwiched between said face plate and back plate.

3. The aircraft braking assembly according to claim 2, wherein said taper is on the order of 0.5-1.5 degrees.

4. The aircraft braking assembly according to claim 3, wherein said film of flexible graphite is of a thickness of 0.02-0.04 inch.

5. The aircraft braking assembly according to claim 2, wherein said face plate is cup-shaped and receives said back plate.

6. The aircraft braking assembly according to claim 5, wherein said face plate is of carbon and said back plate is of steel construction.

* * * * *